March 16, 1926.
D. G. LEONARD
SPRAY DEVICE
Filed August 16, 1922
1,576,662
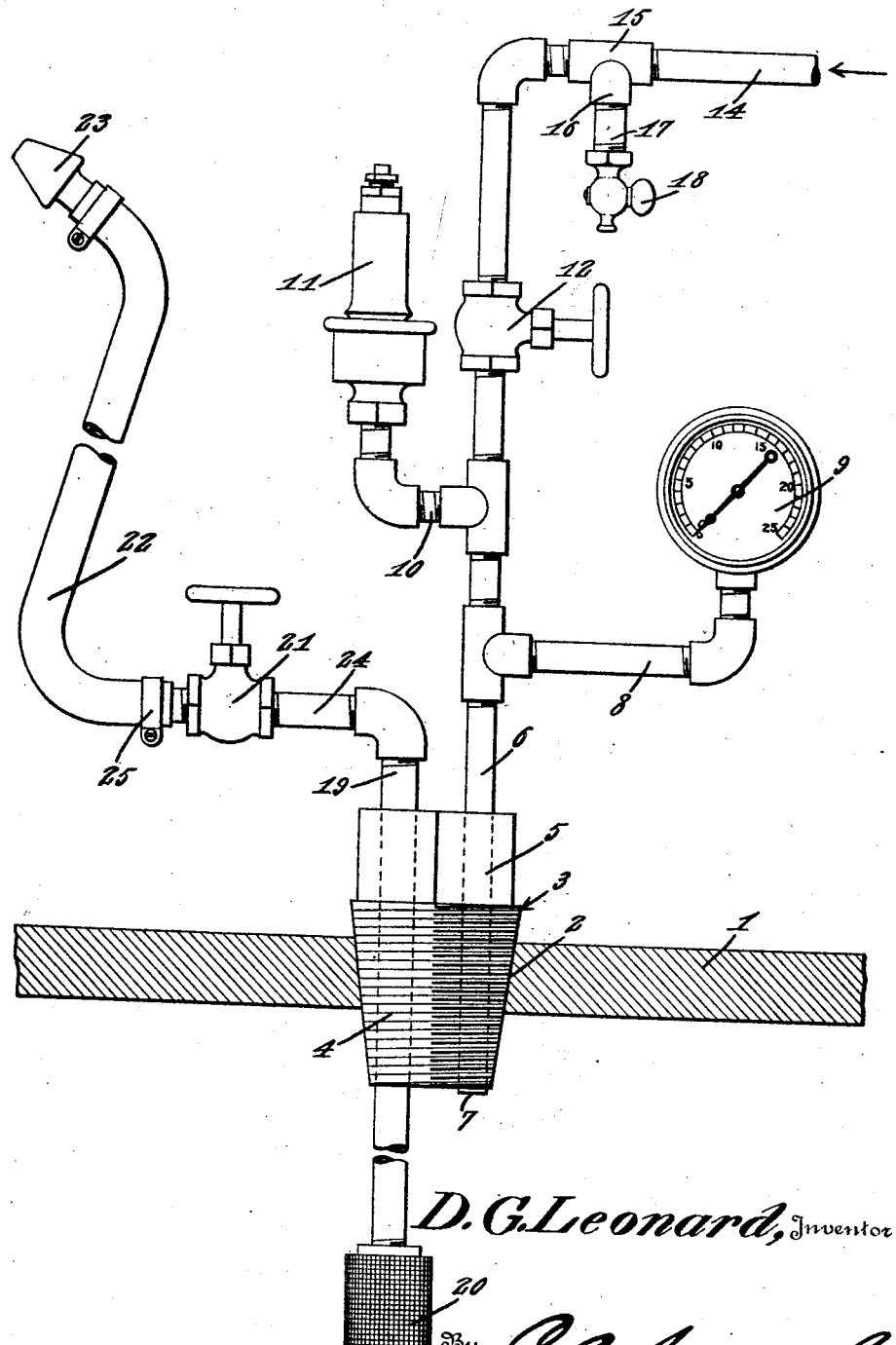
D. G. Leonard, Inventor
By C. A. Snow & Co.
Attorney Patented Mar. 16, 1926.

1,576,662

UNITED STATES PATENT OFFICE.

DAVID G. LEONARD, OF LEXINGTON, NORTH CAROLINA, ASSIGNOR TO BEN F. GREENE, OF LEXINGTON, NORTH CAROLINA.

SPRAY DEVICE.

Application filed August 16, 1922. Serial No. 582,209.

*To all whom it may concern:*

Be it known that I, DAVID G. LEONARD, a citizen of the United States, residing at Lexington, in the county of Davidson and State of North Carolina, have invented a new and useful Spray Device, of which the following is a specification.

This invention aims to provide a simple means whereby varnish or the like may be sprayed on furniture or other objects directly from the container which holds the varnish, novel means being provided for directing air and pressure into the container to bring about an ejection of the contents of the container, means being supplied whereby water in the air may be segregated from the air before the air enters the container.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings, the invention is disclosed in a single figure which is a side elevation, parts being broken away and parts being shown in section.

The numeral 1 denotes the top of a barrel or other container, the top having an opening 2 wherein a closure plug 3 is threaded as at 4, the plug having a wrench head 5. An air conduit 6 extends downwardly through the plug 3, the lower end 7 of the air conduit terminating relatively close to the lower surface of the plug. The air conduit 6 has a lateral branch 8 carrying a pressure gage 9. The conduit 6 has a lateral branch 10 disposed above the branch and projecting in an opposite direction to that in which the branch 8 extends, the branch 10 supporting a pressure release or pop valve 11 which may be set to release the pressure at any desired point. A hand valve 12, under the control of an operator, is interposed in the conduit 6, above the point of connection between the branch 10 and the conduit 6. At its upper end, the conduit 6 has a lateral extension 14 wherein a T 15 is interposed, a nipple 17 being threaded into the depending portion 16 of the T 15, the nipple supporting a pet cock 18 under the control of an operator.

A delivery conduit 19 extends downwardly through the plug 3, any desired distance, into the contents of the barrel or container 1, and is supplied at its lower end with a screen 20. The conduit 19 has a lateral extension 24, projecting in an opposite direction to the branch 8 of the conduit 6. A valve 21, under the control of an operator, is interposed in the extension 24 of the delivery conduit 19. A hose 22 may be secured at 25 to the outer end of the extension 24 of the delivery conduit 19, the hose carrying a nozzle 23, the nozzle being constructed in any desired way, depending upon the nature of the work in hand.

In practical operation, the valve 21 is opened, and the valve 12 is opened, whereupon air, traversing the conduit 6 and its extension 14, will enter the barrel or container 1, the varnish or other material passing through the screen 20 and entering the delivery conduit 19, the varnish moving through the extension 24 of the conduit, through the hose 22 and through the nozzle 23, the varnish or other material thus being applied directly. The flow of varnish through the hose 22 may be stopped at any time by closing the valve 21, and the air supply may be cut off by closing the valve 12. If too high a pressure builds up in the barrel 1, the pop valve 11 will open and release the pressure. The pressure in the barrel or container 1 may be read off at any time on the gage 9. Very often, the air contains moisture and the moisture or water will collect in the nipple 17, it being possible to draw off the water at any time by opening the pet cock 18. Thus, the operator is assured that the air entering the container 1 is reasonably dry, the varnish being discharged through the hose 22 in a comparatively pure condition, and not mixed with water.

What is claimed is:—

In a device of the class described, a threaded plug-closure provided at its upper end with a wrench head, an air conduit extended through the closure and terminated at one end closely adjacent to the inner end of the closure, the opposite end of the conduit being provided with a first lateral branch, the conduit having a second lateral branch, the conduit having a third lateral branch disposed at a point between the first and second lateral branches, the first and second lateral branches projecting in one direction, and the third lateral branch projecting in an opposite direction, a petcock projecting from the first lateral branch in a direction parallel to the conduit, a hand valve in the conduit between the first and third branches and extended laterally from the conduit beneath the petcock, a gage carried by the second lateral branch and disposed closely adjacent to the valve, a pop valve located parallel to the conduit and connected to the third branch, and a delivery conduit extended through the closure and located on the same side of the air conduit as the third branch, the delivery conduit comprising a lateral portion; said lateral portion and the second branch being spaced above the wrench head, and all of the branches, the petcock, the valves and the delivery conduit being located in the same vertical plane, thereby leaving the space open and unencumbered on either side of said plane, to facilitate the application of a wrench to the wrench head of the closure.

In testimony that I claim the foregoing as my own, I have hereto affixed my signature.

DAVID G. LEONARD.